(No Model.)

J. L. ANTHONY.
FASTENING OR LOCKING DEVICE FOR STOVEPIPES.

No. 473,052. Patented Apr. 19, 1892.

Witnesses
E. Byron Gilchrist

Inventor
Jacob L. Anthony

UNITED STATES PATENT OFFICE.

JACOB L. ANTHONY, OF CELINA, OHIO.

FASTENING OR LOCKING DEVICE FOR STOVEPIPES.

SPECIFICATION forming part of Letters Patent No. 473,052, dated April 19, 1892.

Application filed July 25, 1891. Serial No. 400,732. (No model.)

*To all whom it may concern:*

Be it known that I, JACOB L. ANTHONY, of Celina, in the county of Mercer and State of Ohio, have invented certain new and useful Improvements in Fastening or Locking Devices for Stovepipes; and I do hereby declare the following to be a full, clear, and exact description of the invention, such as will enable others skilled in the art to which it pertains to make and use the same.

My invention relates to a locking device designed more especially for locking the stovepipe to the chimney that it enters; and it consists in certain features of construction and in combination of parts hereinafter described, and pointed out in the claim.

Figure 1:
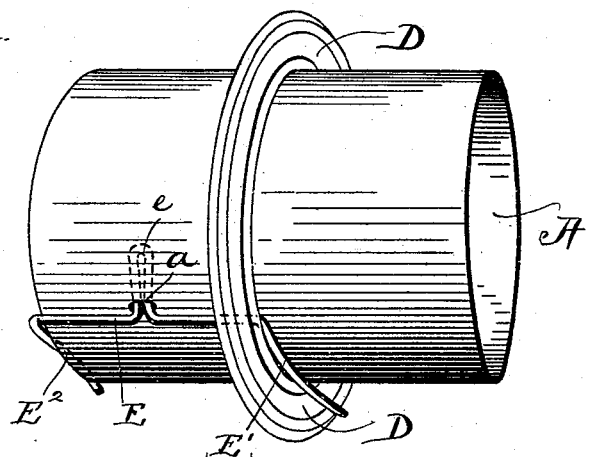
Figure 2:
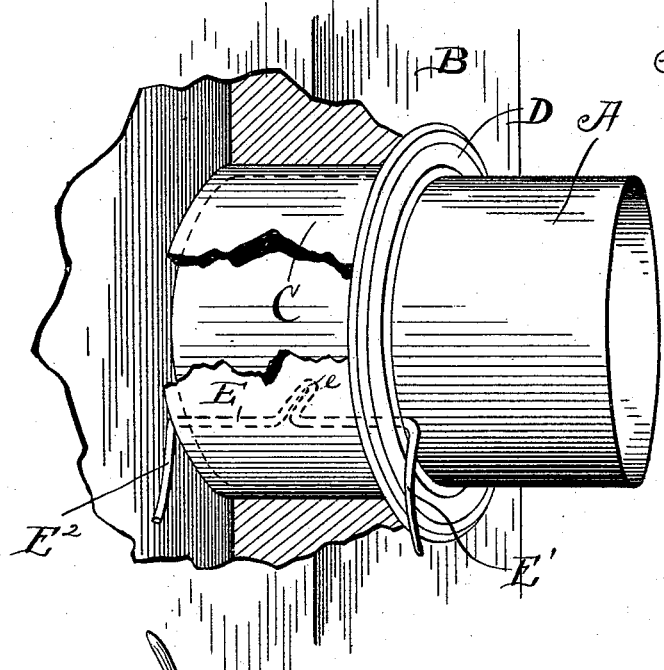
Figure 3:
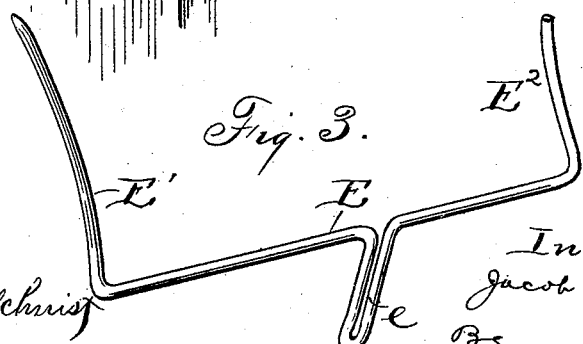

In the accompanying drawings, Figures 1, 2, and 3 are views in perspective illustrating my invention, the latter being enlarged and in detail of the locking-bail.

A represents the section of the pipe that is to enter the chimney B. There is usually a thimble C set in the chimney where the pipe is to enter; but this is not material.

D represents the loose collar usually mounted on the pipe, this collar after the pipe is in place being crowded up against the outer face of the chimney or wall to make a tight joint and to give a better appearance by covering the crack around the pipe.

My improved locking device is shown in detail in Fig. 3, and comprises a wire locking-bail E, bent substantially as shown, this bail having a tongue $e$, adapted to enter a hole $a$ previously made in the pipe. This bail has an arm or handle $E'$ for manipulation and has a locking-arm $E^2$, that when turned to the position shown in Fig. 2 engages the inner face of the chimney, and thereby locks the pipe, so that the latter cannot be withdrawn from the chimney until it is unlocked, which is done by turning the bail to the position shown in Fig. 1, in which latter position of the bail the pipe can be entered or withdrawn from the chimney.

In assembling the parts the tongue of the bail is first entered in the hole of the pipe, after which the bail is turned to the position shown in Fig. 1, and the loose collar is slipped over the pipe and bail to hold the latter in position.

The device is simple, effective, and can be furnished at a trifling cost.

What I claim is—

A locking device for holding pipes in chimneys, consisting of a bar or wire bent to form an axial shank, an arm, a handle, and a projection, the latter adapted to enter an opening in a pipe when the device is turned in one direction on its axis, substantially as set forth.

In testimony whereof I sign this specification, in the presence of two witnesses, this 3d day of July, 1891.

JACOB L. ANTHONY.

Witnesses:
J. G. LOUGHRIDGE,
JOHN M. SCHLOSSER.